(12) United States Patent
Klier

(10) Patent No.: US 8,169,149 B2
(45) Date of Patent: May 1, 2012

(54) CIRCUIT ARRANGEMENT AND METHOD FOR THE OPERATION OF AT LEAST ONE DISCHARGE LAMP

(75) Inventor: Juergen Klier, Traunreut (DE)

(73) Assignee: OSRAM AG, Munich (DE)

(*) Notice: Subject to any disclaimer, the term of this patent is extended or adjusted under 35 U.S.C. 154(b) by 280 days.

(21) Appl. No.: 12/599,516

(22) PCT Filed: May 10, 2007

(86) PCT No.: PCT/EP2007/054532
§ 371 (c)(1),
(2), (4) Date: Nov. 10, 2009

(87) PCT Pub. No.: WO2008/138391
PCT Pub. Date: Nov. 20, 2008

(65) Prior Publication Data
US 2011/0140634 A1 Jun. 16, 2011

(51) Int. Cl.
*H05B 37/00* (2006.01)
(52) U.S. Cl. .............. 315/224; 315/307; 315/DIG. 7
(58) Field of Classification Search .......... 315/307, 315/291, 224, DIG. 5, DIG. 7, DIG. 2
See application file for complete search history.

(56) References Cited

U.S. PATENT DOCUMENTS

| | | | |
|---|---|---|---|
| 5,828,187 A | 10/1998 | Fischer | |
| 5,883,473 A | 3/1999 | Li et al. | |
| 6,731,078 B2 | 5/2004 | Huber et al. | |
| 6,912,140 B2 | 6/2005 | Kasai et al. | |
| 7,248,485 B2 | 7/2007 | Hermann et al. | |
| 7,456,588 B2 * | 11/2008 | Alexandrov | 315/294 |
| 7,808,186 B2 * | 10/2010 | Danjo et al. | 315/219 |
| 7,982,405 B2 * | 7/2011 | Patchornik | 315/224 |

FOREIGN PATENT DOCUMENTS

| | | |
|---|---|---|
| DE | 10147311 C2 | 7/2003 |
| DE | 10162048 A1 | 7/2003 |
| DE | 102005041076 A1 | 3/2007 |
| EP | 0779768 B1 | 5/2000 |
| EP | 1231821 B1 | 8/2004 |

OTHER PUBLICATIONS

International Search Report dated Mar. 12, 2008.
Abstract for reference DE 10147311C2, Mar. 2007.
Abstract for reference DE 102005041076A1.

* cited by examiner

Primary Examiner — David Hung Vu

(57) ABSTRACT

Circuit arrangement for operation of discharge lamp comprising an input for connecting a supply alternating current voltage. A startup supply device is provided with an input and an output, where the input is connected to an input of a control circuit and the output is connected to another input of the control circuit. The startup supply device provides a startup supply voltage at the output of the startup supply device and hence reduces the stand-by losses.

10 Claims, 4 Drawing Sheets

US 8,169,149 B2

CIRCUIT ARRANGEMENT AND METHOD FOR THE OPERATION OF AT LEAST ONE DISCHARGE LAMP

RELATED APPLICATIONS

The present application is a national stage entry according to 35 U.S.C. §371 of PCT application No.: PCT/EP2007/054532 filed on May 10, 2007.

BACKGROUND

The present invention relates to a circuit arrangement for the operation of at least one discharge lamp with an input for connecting an AC supply voltage, a rectifier, which is coupled to the input and has a first output terminal and a second output terminal for providing a DC supply voltage, an inverter, which includes at least a first switch and a second switch, which are coupled in series between the first output terminal and the second output terminal of the rectifier, a control circuit which is at least designed to drive the first switch and the second switch, with a first input for receiving a control signal, and a second input for feeding a voltage for supplying the control circuit, the second input being connected to an operational supply apparatus, which is designed to couple an operational supply voltage to the second input of the control circuit during operation of the inverter and a control line, which is coupled firstly to the input for connecting an AC supply voltage and secondly to the first input for receiving a control signal, a third switch being arranged in the control line. The invention moreover relates to a method for the operation of at least one discharge lamp using such a circuit arrangement.

Circuit arrangements, in particular electronic ballasts, which are switched on and off via a control input, have a power consumption in the switched-off state of up to 1 W, which is referred to as standby losses. The cause of these losses is primarily the internal control circuit, which needs to be supplied with voltage even in the "off" state, in order to be able to react to the next "on" command. The losses caused by the internal control circuit make up approximately 60% of the standby losses. 30% of the standby losses are produced by the filament monitoring, and 10% of the losses by the switched-mode power supply.

For a more detailed illustration of the problem on which the invention is based, reference is first made to FIG. 1, which shows a circuit arrangement of the generic type known from the prior art. Said circuit arrangement has an input E1, E2 for connecting an AC supply voltage $U_N$. Connected thereto are a first X capacitor Cx1, two inductances L1$a$, L1$b$, which are coupled to one another, a rectifier 10 and a second X capacitor Cx2. A discharge lamp La is connected via an inductance L3 to the half-bridge center point HM of an inverter, which includes a first switch Q2 and a second switch Q3. A capacitor C3 is arranged in parallel with the lamp La. The circuit arrangement includes a control circuit 12, which in this case solves various problems. Firstly, the first switch Q2 of the inverter is driven via a control output HSG of the control circuit 12, and the switch Q3 of the inverter is driven via a control output LSG of the control circuit 12. An input Line is used for measuring the system voltage, which input evaluates the voltage across a nonreactive resistor R2 of a voltage divider including the nonreactive resistors R1 and R2. The resistor R1 is coupled to the voltage provided at the capacitor Cx2. Using the inductances L2$a$, L2$b$, which are coupled to one another, and the nonreactive resistor R8, a zero crossing of the current is determined by the inductance L2$a$ via an input ZC in order to drive a switched-mode power supply, which includes a transistor Q1, a diode D1, the inductances L2$a$, L2$b$, a nonreactive resistor R8 and a capacitor C1, in a suitable manner via an output PFG. In this case, the transistor Q1, the diode D1 and the capacitor C1 form a PFC (power factor correction) apparatus. Using the nonreactive resistors R3 and R4, which together form a voltage divider, the amplitude of the so-called intermediate circuit voltage $U_{ZW}$ is measured via an input Bus. The clock signal produced by a push-button T1 which in this case is coupled to the input E2, is converted via a pulse-shaping apparatus 14, which includes the nonreactive resistors R9 and R10 and a diode D4 and a capacitor C6, into a pulse, which is coupled to the input Cntrl of the control circuit 12 via the section 16 of a control line St. Via a nonreactive resistor R7, which is coupled to the intermediate circuit voltage $U_{ZW}$, the control circuit 12, after reception of an off signal at the Cntrl input, continues to be supplied with voltage via the input SS in order to be reception-ready for the next on command at the Cntrl input. During operation of the discharge lamp La, the control circuit 12 is supplied with voltage via an operational supply apparatus, the operational supply apparatus including the capacitor C2, the diodes D2 and D3 and the capacitor C5. In this case, the voltage $U_{VCC}$ is provided across the capacitor C5, which is coupled to the input VCC of the control circuit 12. This input VCC is furthermore used for determining, using the nonreactive resistors R5 and R6 and the capacitor C4, whether a discharge lamp La has been inserted.

Details regarding operation: The circuit arrangement illustrated in FIG. 1 is part of an electronic ballast, which can be switched on and off via a pushbutton T1. In this case, the system voltage $U_N$ is present across the circuit arrangement even in the off state. It is only the internal control circuit 12 which is stopped, with the result that the PFC transistor Q1 and the inverter, which includes the switches Q2 and Q3, are no longer driven. The internal control circuit 12 needs to continue to be supplied with voltage via the nonreactive resistor R7 in order to be reception-ready for the next on command. The internal control circuit 12 in this case, together with its supply via the nonreactive resistor R7, causes the majority of the standby losses.

Furthermore, a plurality of current paths which produce the measured values for the various functions of the electronic ballast increase the standby losses: Particular mention should be made of the filament monitoring, which includes the two nonreactive resistors R5 and R6, which are connected in series with an electrode of the fluorescent lamp La and only allows a current to flow from the so-called intermediate circuit, i.e. the line of the circuit arrangement across which the intermediate circuit voltage $U_{ZW}$ is provided, to the internal control circuit 12 when the fluorescent lamp La is inserted. The filament monitoring ensures that the electronic ballast can start only when the fluorescent lamp La is inserted, that the electronic ballast, which is automatically shut down once a lamp fault has been identified, remains shut down, and that the electronic ballast automatically restarts (relamping) once a defective fluorescent lamp has been replaced.

The switched-mode power supply, which includes the inductances L2$a$ and L2$b$, the nonreactive resistor R8 and the PFC apparatus, which has the transistor Q1, the diode D1 and the capacitor C1, is controlled in such a way that the intermediate circuit voltage $U_{ZW}$ is kept at a constant value in a load-independent manner, and that the system current drawn is sinusoidal. For this purpose, a control signal is used which is proportional to the product of the control discrepancy between the intermediate circuit voltage $U_{ZW}$ and the present value of the system voltage $U_N$. For this purpose, the system voltage $U_N$ is interrogated via the nonreactive resistors R1 and R2, and the intermediate circuit voltage $U_{ZW}$ is interrogated via the nonreactive resistors R3 and R4, by the internal control circuit 12.

SUMMARY

Various embodiments provide a circuit arrangement of the generic type such that it has reduced standby losses.

Various embodiments are based on the knowledge that the abovementioned reduced standby losses can be achieved with a circuit arrangement of the generic type if the off signal on the control line is used to completely shut down the electronic ballast, including the internal control circuit. The "on" signal triggered by the next depression of the pushbutton T1 serves not only as the control signal "on", but at the same time to supply the internal control circuit until the electronic ballast is started and the supply to the internal control circuit again functions via the known operational supply apparatus.

Therefore, a circuit arrangement according to the invention furthermore includes a startup supply apparatus with an input and an output, its input being coupled to the first input of the control circuit, and its output being coupled to the second input of the control circuit, the startup supply apparatus being designed to provide a startup supply voltage at the output of the startup supply apparatus in the event of an on signal at the input of the startup supply apparatus when the control circuit has no supply and therefore is switched off.

By virtue of this measure, the control circuit can be shut down completely until the reception of a new on signal, i.e. a supply as is provided in the prior art via the resistor R7 is not provided in this phase. The control circuit therefore does not cause any standby losses during standby operation.

In a preferred embodiment, the operational supply apparatus includes a first capacitor, which is coupled to the second input of the control circuit, the startup supply apparatus being designed to couple the on signal at its input, as startup supply voltage, to the first capacitor, in order to charge the latter. Thus, the same capacitor and the same input of the control circuit are used for the startup supply as for the operational supply, which results in an extremely favorable embodiment.

Preferably, the circuit arrangement includes a second capacitor, which is coupled between the DC supply voltage and a first terminal for the discharge lamp, and a third capacitor, which is coupled between the second terminal for the discharge lamp and the reference potential, the startup supply apparatus being designed to convert the charging current of the third capacitor, which charging current occurs once a discharge lamp has been inserted, into a voltage pulse and to provide this voltage pulse at the output of the startup supply apparatus. Thus, the relamping function is made possible, i.e. a control pulse, which is sufficient for startup of the control circuit, is provided at the input VCC of the control circuit once a lamp has been inserted. Owing to the fact that the first input of the control circuit is coupled to the second input of the control circuit via the startup supply apparatus, the charging current of the third capacitor can therefore also be applied to the first input of the control circuit in order thus to provide an on signal at the control circuit. As a result, the charging current of the third capacitor is used during relamping firstly for providing a supply voltage for the control circuit, and secondly as an on signal for the control circuit.

Particularly preferably, in this case the circuit arrangement furthermore has a charging-current amplification apparatus, which is designed to amplify the charging current of the third capacitor, the charging-current amplification apparatus being coupled between the DC supply voltage and the reference potential. As a result of the dimensioning of the charging-current amplification apparatus, it is therefore possible to ensure that the charging current of the third capacitor is also always sufficient during relamping to supply the internal control circuit with sufficient voltage.

Preferably, a nonreactive resistor is connected in parallel with the third capacitor. This measure ensures rapid discharge of the third capacitor when the lamp is removed.

It is furthermore preferable for the startup supply apparatus to include a coupling apparatus, which is arranged in such a way that the second input of the control circuit can be coupled to the DC supply voltage via the coupling apparatus, the coupling apparatus having a control input, which is coupled to the input of the startup supply apparatus. Therefore, the DC supply voltage is "tapped" to supply the control circuit only when an on signal has been received at the input of the startup supply apparatus. In a particularly preferred embodiment, in this case the coupling apparatus comprises a fourth and a fifth switch and at least one nonreactive resistor, which are arranged in such a way that, by driving of the fourth switch with the signal at the input of the startup supply apparatus, a current flow through the nonreactive resistor is made possible, with the voltage drop produced thereby across the nonreactive resistor being coupled to the control path of the fifth switch, in order to switch the fifth switch into the on state, as a result of which the fifth switch, which is coupled to the DC supply voltage, applies the DC supply voltage to the output of the startup supply apparatus.

Preferably, in this case the first input of the control circuit is coupled, through the control circuit, to the input of the startup supply apparatus. Here, holding elements can be provided in order to provide a pulse-shaped on signal at the first input of the control circuit as a permanent on signal at the input of the startup supply apparatus. As a result, the filament monitoring is activated during operation of the discharge lamp.

Preferably, the third switch is in the form of a pushbutton. Without actuation of the third switch, startup of the control circuit during so-called relamping is produced by a discharge lamp being inserted.

The preferred embodiments and advantages thereof set forth with reference to a circuit arrangement according to the invention apply correspondingly, if appropriate, to the method according to the invention.

BRIEF DESCRIPTION OF THE DRAWING(S)

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced.

Figure 1:
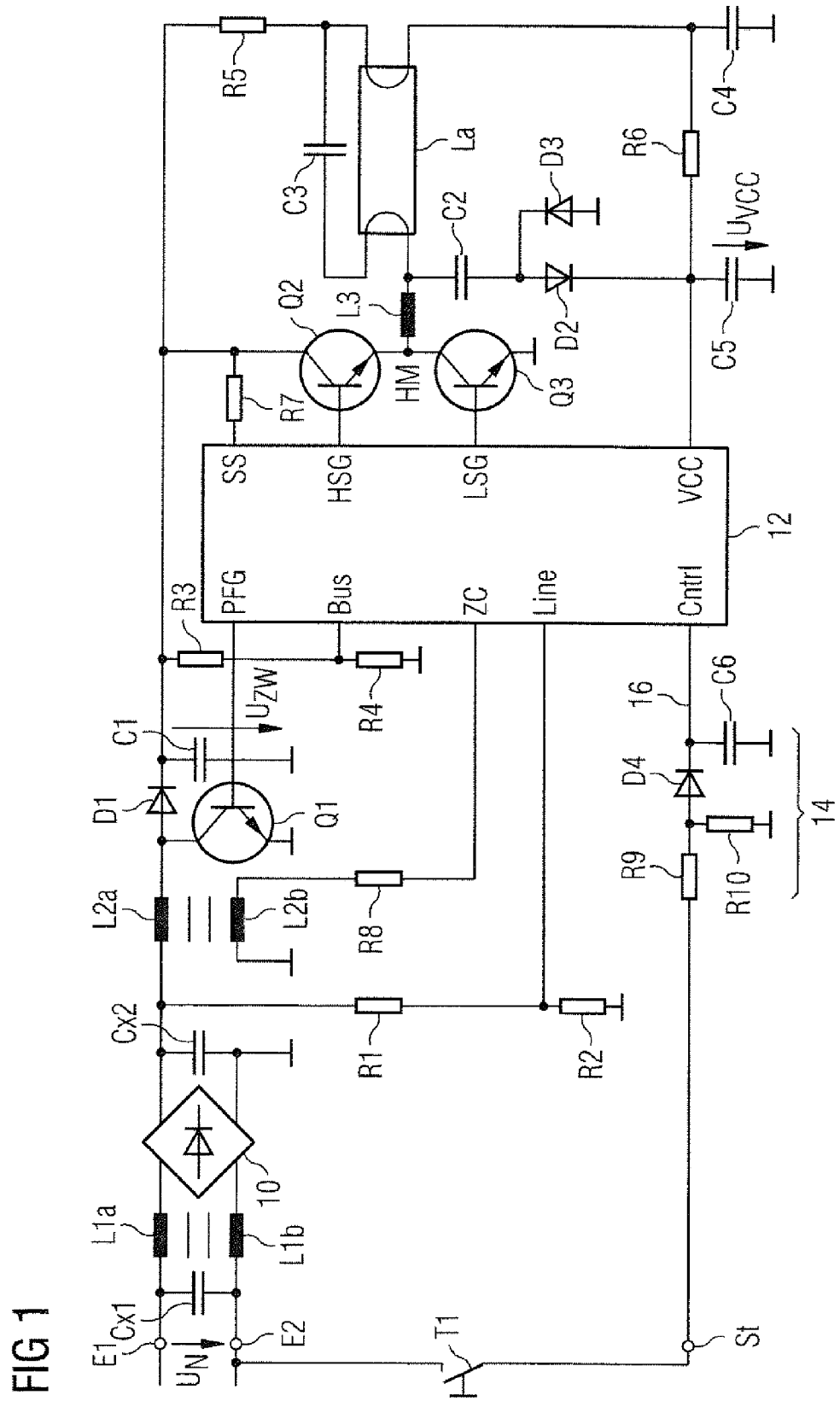
FIG. 1 shows a schematic illustration of a circuit arrangement known from the prior art for the operation of at least one discharge lamp.
Figure 2:
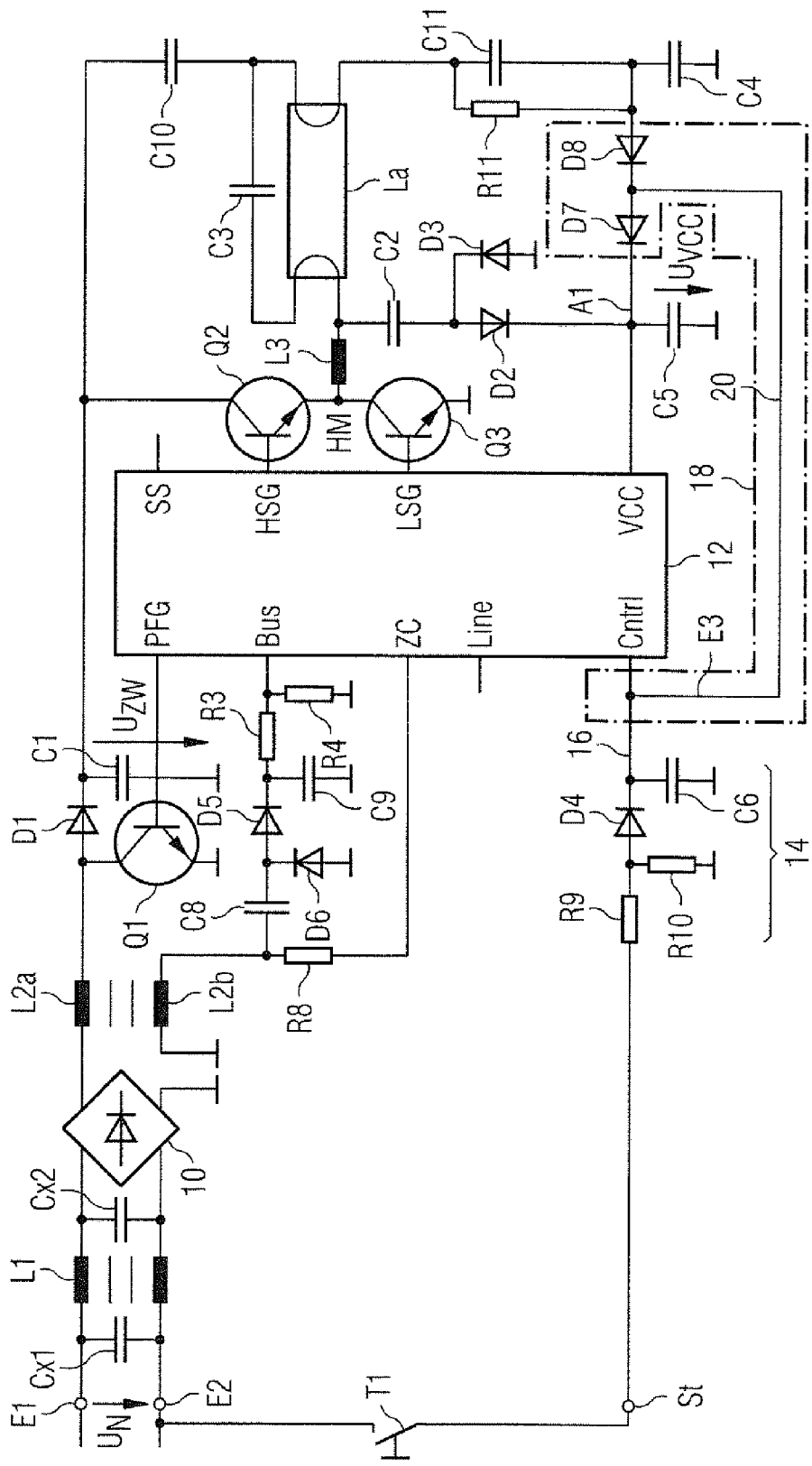
FIG. 2 shows a schematic illustration of a first exemplary embodiment of a circuit arrangement according to the invention.
Figure 3:
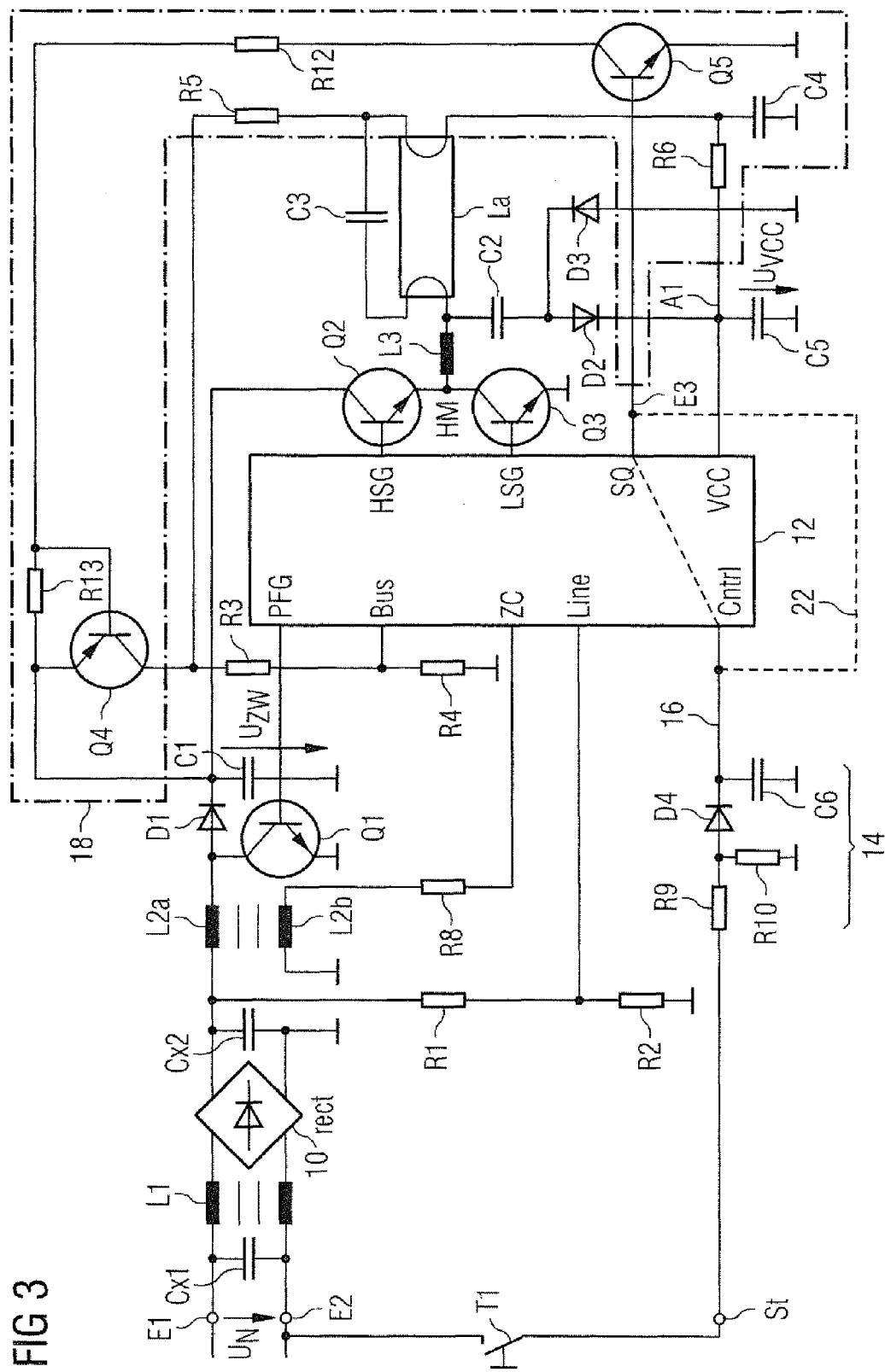
FIG. 3 shows a schematic illustration of a second exemplary embodiment of a circuit arrangement according to the invention.
Figure 4:
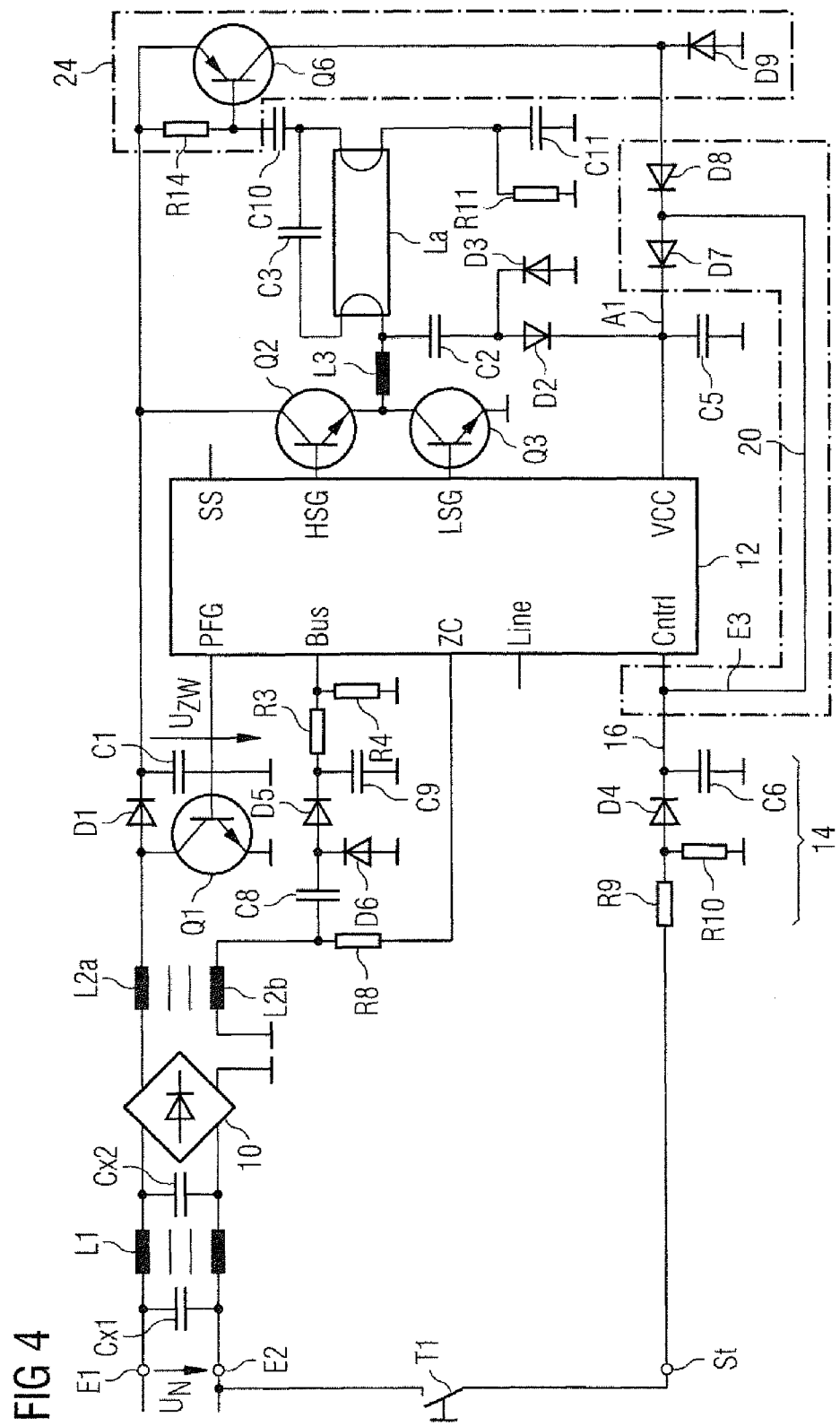
FIG. 4 shows a schematic illustration of a third exemplary embodiment of a circuit arrangement according to the invention.

The components introduced with reference to FIG. 1 and the reference symbols thereof apply, insofar as they relate to identical or similar components, to the exemplary embodiments of circuit arrangements according to the invention illustrated in FIGS. 2 to 4 as well. They are therefore not introduced again, with the result that the description below substantially provides details on the differences from the prior art illustrated in FIG. 1.

The first exemplary embodiment illustrated schematically in FIG. 2 of a circuit arrangement according to the invention has a startup supply apparatus 18, which has an input E3 and an output A1. The input E3 is coupled to the first input Cntrl of the control circuit 12, and the output A1 is coupled to the second input VCC of the control circuit 12. The startup supply apparatus 18 includes a line 20, which is designed to produce an on signal on the control line 16 for charging the capacitor C5 and therefore for providing a startup supply voltage at the input VCC of the control circuit 12. For this purpose, the startup supply apparatus 18 furthermore comprises two diodes D7 and D8.

Although FIG. 2 illustrates an embodiment with a pushbutton T1, with which the system voltage $U_N$ can be switched to the control input Cntrl of the control circuit 12, the present invention can be used in all control methods which operate with non-potential-free control signals. In the exemplary embodiment shown, a brief depression of the pushbutton T1 results in the electronic ballast in which a circuit arrangement according to the invention is implemented being switched on and switched off, and a long depression of the pushbutton serves the purpose of changing the dimming setting alternately upwards or downwards.

The internal control circuit 12 is in this case only supplied with voltage as long as the electronic ballast is in operation. A charge pump, which includes the capacitor C2 and the diodes D2 and D3, is used in this case for the operational supply. This operational supply draws its power from an electronic-ballast-internal AC voltage signal, for example from the lamp voltage. An off signal at the control input St, produced by a depression of the pushbutton T1, stops the control circuit 12 and therefore the circuit arrangement according to the invention. The control circuit 12 then no longer has a supply. The next depression of the pushbutton T1 is firstly interpreted as an on signal at the input Cntrl of the control circuit 12 and is secondly used, via the diode D7, for charging the capacitor C5. The control circuit 12 is thus started and supplied with voltage from the capacitor C5 until the circuit arrangement according to the invention has been started up and the operational supply via the charge pump C2, D2, D3 functions again.

It is not necessary for the shutdown to be stored after a lamp defect has been identified in the case of a circuit arrangement according to the invention since the circuit arrangement does not start up again independently, but only after an on signal from the pushbutton T1.

If, during relamping, a new lamp La is inserted, the charging current of the capacitor C11 produces a voltage pulse across C4, which charges the capacitor C5 via the diodes D7 and D8 and thus supplies the control circuit 12 with voltage until the circuit arrangement has started up and the operational supply via the charge pump C2, D2, D3 functions again. At the same time, this voltage pulse via the diode D8 and the line 20 acts as an on signal at the input Cntrl of the control circuit 12. The resistor R11, which is connected in parallel with the capacitor C11, ensures rapid discharge of the capacitor C11 when the lamp La is removed. This results in rapid generation of the starting conditions after relamping.

Thus, the filament monitoring, as has been described with reference to FIG. 1, is not required. The standby losses which have resulted in the prior art from the filament monitoring, therefore likewise do not occur in the case of a circuit arrangement according to the invention as shown in FIG. 2.

A further reduction in the standby losses can be achieved by modification of the switched-mode power supply. Said switched-mode power supply can dispense with the measurement of the system voltage, as was carried out in the circuit arrangement shown in FIG. 1 using the resistors R1 and R2, if the switch-on time of the transistor Q1 of the PFC apparatus is only dependent on the control discrepancy of the intermediate circuit voltage $U_{ZW}$, and no longer on the system voltage $U_N$. In order furthermore to achieve a sinusoidal current consumption, the X-capacitor Cx2 then needs to be connected upstream of the rectifier 10, however.

A further reduction in standby losses results if the intermediate circuit voltage $U_{ZW}$ is determined from the peak-to-peak voltage across the inductance L2b, which indicates the current zero crossing, via the peak-to-peak rectifier, which includes the components C8, D6, D5. The voltage divider R3, R4 therefore no longer needs to be connected to the intermediate circuit voltage $U_{ZW}$ and therefore no longer produces any standby losses.

A second exemplary embodiment of a circuit arrangement according to the invention is illustrated schematically in FIG. 3. In this exemplary embodiment, the input Cntrl of the control circuit 12 is coupled through the control circuit 12, to the output S0 of the control circuit 12. The signal present at the output S0 is coupled to the input E3 of the startup supply apparatus 18, the output A1 of the startup supply apparatus 18 again being coupled to the capacitor C5. In this case, the startup supply apparatus 18 comprises a coupling apparatus, which includes a switch Q4, a switch Q5 and two nonreactive resistors R12 and R13. In this case, the input of the switch Q5 is coupled to the input E3 of the coupling apparatus 18, and therefore to the output S0 of the control circuit 12. If the switch Q5 is switched into the on state by an on signal at the output S0 of the control circuit 12, a current flow through the nonreactive resistors R12 and R13 thus results. The voltage drop across the nonreactive resistor R13 is applied to the control path of the switch Q4, as a result of which said switch is switched into the on state and supplies the intermediate circuit voltage $U_{ZW}$, via the resistor R5, and electrode of the lamp La and the nonreactive resistor R6, to the capacitor C5 in order to charge said capacitor and therefore to provide a startup supply voltage to the control circuit 12 via the input VCC thereof. The measurement of the intermediate circuit voltage $U_{ZW}$ is likewise dependent on the switching state of the switch Q4, with the result that a measurement of the intermediate circuit voltage takes place via the resistors R3 and R4 only when the switch Q4 is switched on. This does not result in any standby losses, in contrast to the arrangement for measuring the intermediate circuit voltage shown in FIG. 1.

Instead of the signal at the input Cntrl of the control circuit 12 being passed on internally to the output S0 of the control circuit 12, this can be achieved easily by virtue of an external line 22, as is illustrated by dashed lines in FIG. 2.

In the embodiment shown in FIG. 4, a charging-current amplification apparatus 24 is provided which is used to amplify the charging current of the capacitor C11 if said charging current is insufficient during relamping for supplying the internal control circuit 12 with sufficient voltage. For this purpose, the charging current is passed via a nonreactive resistor R14, which applies a voltage to the control path of a switch Q6. Owing to the voltage drop across the nonreactive resistor R14, the switch Q6 is switched into the on state, with the result that the intermediate circuit voltage $U_{ZW}$ is applied to the capacitor C5 via the diodes D8 and D7. In this case, a zener diode D9 protects the internal control circuit 12 against overvoltage.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A circuit arrangement for the operation of at least one discharge lamp, the circuit arrangement comprising: an input for connecting an AC supply voltage; a rectifier, which is coupled to the input and has a first output terminal and a second output terminal for providing a DC supply voltage; an inverter, which comprises at least a first switch and a second switch, which are coupled in series between the first output terminal and the second output terminal of the rectifier; a control circuit which is at least designed to drive the first switch and the second switch, with a first input for receiving a control signal, and a second input for feeding a voltage for supplying the control circuit, the second input being connected to an operational supply apparatus, which is designed to couple an operational supply voltage to the second input of the control circuit during operation of the inverter; a control line, which is coupled firstly to the input for connecting an AC supply voltage and secondly to the first input for receiving a control signal, a third switch being arranged in the control line; wherein it furthermore comprises a startup supply apparatus with an input and an output, its input being coupled to the first input of the control circuit, and its output being coupled to the second input of the control circuit, the startup supply apparatus being designed to provide a startup supply voltage at the output of the startup supply apparatus in the event of an on signal at the input of the startup supply apparatus when the control circuit has no supply and therefore is switched off.

2. The circuit arrangement as claimed in claim 1, wherein the operational supply apparatus comprises a first capacitor, which is coupled to the second input of the control circuit, the startup supply apparatus being designed to couple the on signal at its input, as startup supply voltage, to the first capacitor in order to charge the latter.

3. The circuit arrangement as claimed in claim 1, wherein the circuit arrangement comprises a second capacitor, which is coupled between the DC supply voltage and a first terminal for the discharge lamp, and a third capacitor, which is coupled between the second terminal for the discharge lamp and the reference potential, the startup supply apparatus being designed to convert the charging current of the third capacitor, which charging current occurs once a discharge lamp has been inserted, into a voltage pulse and to provide this voltage pulse at the output of the startup supply apparatus.

4. The circuit arrangement as claimed in claim 3, wherein the circuit arrangement furthermore comprises a charging-current amplification apparatus, which is designed to amplify the charging current of the third capacitor, the charging-current amplification apparatus being coupled between the DC supply voltage and the reference potential.

5. The circuit arrangement as claimed in claim 3, wherein a nonreactive resistor is connected in parallel with the third capacitor.

6. The circuit arrangement as claimed in claim 1, wherein the startup supply apparatus comprises a coupling apparatus, which is arranged in such a way that the second input of the control circuit can be coupled to the DC supply voltage via the coupling apparatus, the coupling apparatus having a control input, which is coupled to the input of the startup supply apparatus.

7. The circuit arrangement as claimed in claim 6, wherein the coupling apparatus comprises a fourth and a fifth switch and at least one nonreactive resistor, which are arranged in such a way that, by driving of the fourth switch with the signal at the input of the startup supply apparatus, a current flow through the nonreactive resistor is made possible, with the voltage drop produced thereby across the nonreactive resistor being coupled to the control path of the fifth switch, in order to switch the fifth switch into the on state, as a result of which the fifth switch, which is coupled to the DC supply voltage, applies the DC supply voltage to the output of the startup supply apparatus.

8. The circuit arrangement as claimed in claim 6, wherein the first input of the control circuit is coupled, through the control circuit, to the input of the startup supply apparatus.

9. The circuit arrangement as claimed in claim 1, wherein the third switch is in the form of a pushbutton.

10. A method for the operation of at least one discharge lamp using a circuit arrangement with an input for connecting an AC supply voltage; a rectifier, which is coupled to the input and has a first output terminal and a second output terminal for providing a DC supply voltage; an inverter, which comprises at least a first switch and a second switch, which are coupled in series between the first output terminal and the second output terminal of the rectifier; a control circuit which is at least designed to drive the first switch and the second switch, the control circuit having a first input for receiving a control signal, and a second input for feeding a voltage for supplying the control circuit, the second input being connected to an operational supply apparatus, which is designed to couple an operational supply voltage to the second input of the control circuit during operation of the inverter; the circuit arrangement furthermore comprising a control line, which is coupled firstly to the input for connecting an AC supply voltage and secondly to the first input for receiving a control signal, a third switch being arranged in the control line; the method comprising: a) when the control circuit has no supply and therefore is switched off: Coupling an on signal at the first input of the control circuit to the input of the startup supply apparatus; b) in the event of the on signal at the input of the startup supply apparatus: Production of a startup supply voltage at the input of the startup supply apparatus; and c) coupling of the startup supply voltage at the output of the startup supply apparatus to the second input of the control circuit.

* * * * *